W. E. McCOY.
APPARATUS FOR SHAPING CONDUITS.
APPLICATION FILED MAY 26, 1917.

1,266,293.

Patented May 14, 1918.

INVENTOR
Walter E. McCoy
BY Park Benjamin
ATTORNEY

UNITED STATES PATENT OFFICE.

WALTER E. McCOY, OF NEW YORK, N. Y.

APPARATUS FOR SHAPING CONDUITS.

1,266,293.   Specification of Letters Patent.   Patented May 14, 1918.

Application filed May 26, 1917. Serial No. 171,333.

*To all whom it may concern:*

Be it known that I, WALTER E. MCCOY, a citizen of the United States, residing at New York, in the county of New York and State of New York, have invented a certain new and useful Improvement in Apparatus for Shaping Conduits, of which the following is a specification.

The invention is an apparatus for producing a projection or protuberance of predetermined shape upon the wall of a tube or pipe of ductile metal. The apparatus comprises substantially two coöperating dies, one of which is disposed within the pipe and the other outside of the pipe, which dies are drawn together by suitable means, thus producing a protuberance on said wall corresponding in configuration to said dies.

In the accompanying drawings—

Figure 1:
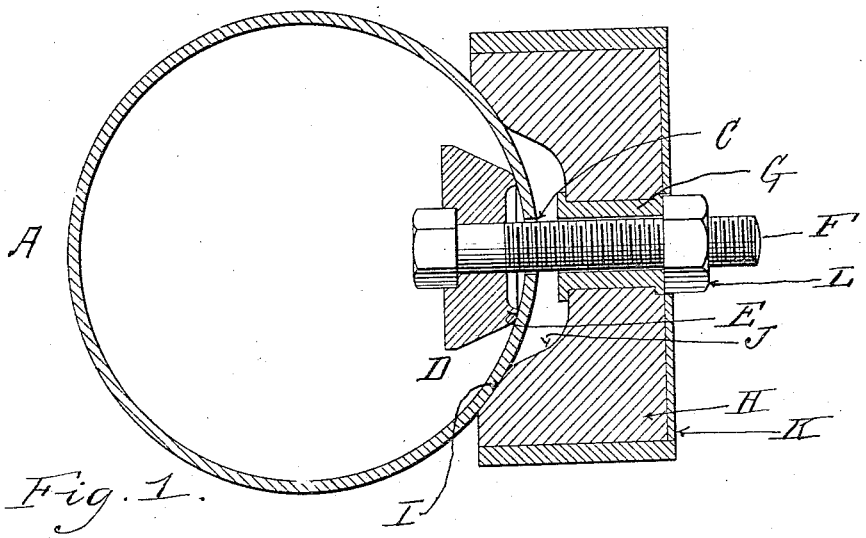
Figure 2:
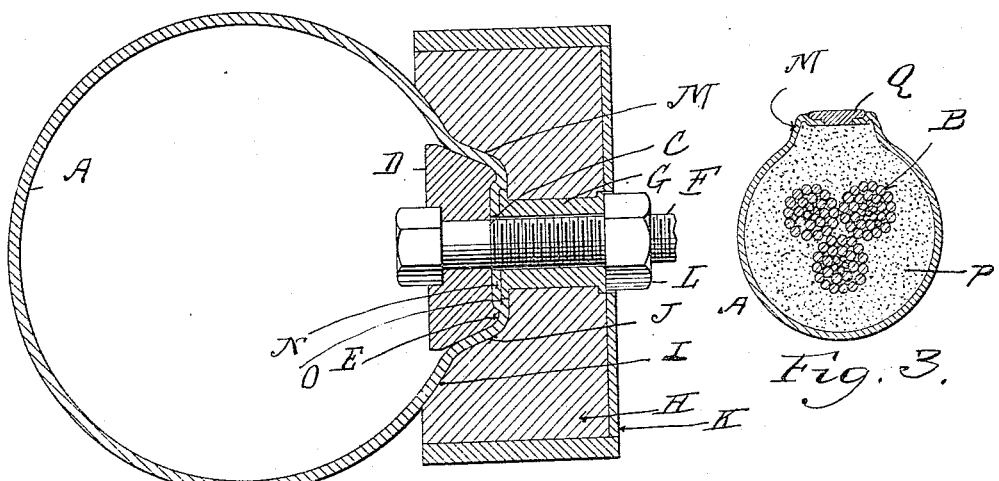
Figure 3:
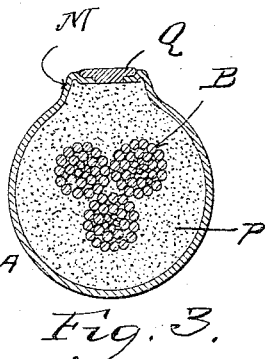
Figure 4:
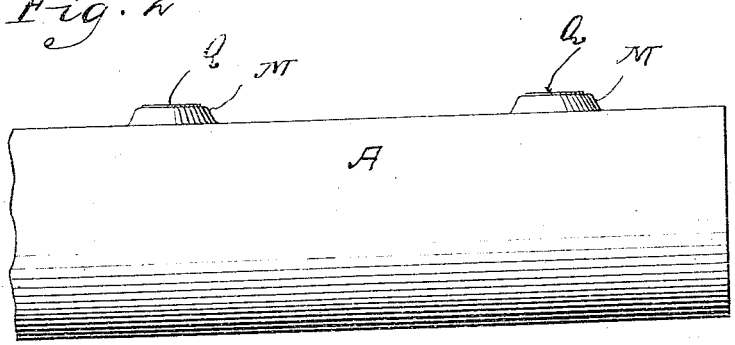

Figure 1 is a cross section of a pipe with my apparatus in place and before operation. Fig. 2 is a similar view, showing the result of operating said device. Fig. 3 is a cross section of the pipe, on a reduced scale, after the projection thereon has been made. Fig. 4 is an elevation of the pipe, showing two projections with their covers in place.

Similar letters of reference indicate like parts.

A is a metal pipe or tube of ductile metal, which may be used to inclose electrical conductors B, Fig. 3. I first make in the wall of said pipe an opening C. I then place within said pipe a circular die D, preferably of steel and of frusto-conical shape, and having on its smaller face a circular rib E. A headed screw bolt F is passed through a central opening in said die, and through the opening C in the tube wall, the head of said bolt being received in a countersink in the larger face of said die D, which countersink is of the same shape as the bolt head, so as to prevent said bolt from rotating. The threaded portion of the bolt is passed through a metal bushing G in a wooden block H, in one face of which there is an elongated recess I fitting upon said pipe, in which recess is a circular matrix or die J concentric with the bushing G. The matrix or die J coöperates with the die D. On the outer side of block H may be a steel plate K, against which bears a nut L on the threaded portion of bolt F.

The parts being in the position shown in Fig. 1, the nut L is rotated by a suitable wrench, thus forcing the die D and the matrix J into coöperation, so that an annular projection M is formed upon the tube wall, surrounding the opening C therein. By reason of the contact of the projection with the bottom of the matrix J it becomes inwardly flanged. The middle portion N of said flange or outer face of said projection, which is formed by the inner end of bushing G is flat, and surrounding the same is an annular rib O formed by the rib E on die D. Said rib coöperates with the annular groove formed between the inner end of the bushing G and the circumferential surface of the matrix, as shown in Fig. 2.

After projection M is completed, the die D and block H, bolt F and nut L are removed. The conductors B are inserted in the tube A, and the plastic or liquid filling material P is poured therein through the opening C in said projection, until the space within the tube and also within the projection is filled, thus insuring the complete filling of the tube space by the superabundant material finally rising in projection M. I then place a shouldered disk Q in the opening C in the projection M, as shown in Figs. 3 and 4, and solder or otherwise secure the same in place.

I claim:

1. An apparatus for producing a projection upon a pipe, comprising two coöperating relatively movable dies, one of said dies being disposed within said pipe, and means extending through the other die and secured to said inner die for moving said dies into coöperation, and thereby forming a protuberance on said pipe wall corresponding in configuration to said dies.

2. An apparatus for producing a projection upon a pipe, comprising a block constructed to fit upon said pipe longitudinally, a matrix in said block, a circular die within said pipe conforming in configuration to said matrix, and a screw for forcing said circular die outwardly to cause the wall of said pipe to enter said matrix and take the configuration thereof.

3. An apparatus for producing a projection upon a pipe, as in claim 2, the said screw being secured in said circular die, extending through the same and said pipe-receiving block, and a nut outside of said last-named block engaging said screw.

4. An apparatus for producing upon the wall of a pipe an inwardly flanged projection having a central opening, comprising a die within said pipe, a threaded bolt of less diameter than said die secured in said die and passing through an opening in said pipe wall, a block having a matrix coöperating with said die and receiving said bolt, and a nut on said bolt outside of said block, whereby upon the rotation of said nut said die and matrix are drawn together to produce on said pipe wall a protuberance corresponding in configuration to said die and matrix.

5. An apparatus, as in claim 4, the said matrix having in its bottom an annular groove surrounding the opening therein, and the said die having on its face an annular projecting rib coöperating with said groove to produce a similar rib in the flange of said projection.

In testimony whereof I have affixed my signature in presence of two witnesses.

WALTER E. McCOY.

Witnesses:
GERTRUDE T. PORTER,
MAY T. McGARRY.

Copies of this patent may be obtained for five cents each, by addressing the "Commissioner of Patents, Washington, D. C."